United States Patent
Chen et al.

(10) Patent No.: US 8,300,904 B2
(45) Date of Patent: Oct. 30, 2012

(54) METHOD AND DEVICE FOR DETERMINING A SIMILARITY VALUE BETWEEN MINUTIAE TEMPLATES

(75) Inventors: Tai Pang Chen, Singapore (SG); Wei Yun Yau, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 395 days.

(21) Appl. No.: 12/669,421

(22) PCT Filed: Jul. 18, 2008

(86) PCT No.: PCT/SG2008/000258
§ 371 (c)(1),
(2), (4) Date: Apr. 21, 2010

(87) PCT Pub. No.: WO2009/011661
PCT Pub. Date: Jan. 22, 2009

(65) Prior Publication Data
US 2010/0202671 A1    Aug. 12, 2010

Related U.S. Application Data

(60) Provisional application No. 60/950,380, filed on Jul. 18, 2007.

(51) Int. Cl.
*G06K 9/00* (2006.01)
(52) U.S. Cl. .................. 382/124; 382/115; 382/125
(58) Field of Classification Search .................. None
See application file for complete search history.

(56) References Cited

U.S. PATENT DOCUMENTS

| | | | |
|---|---|---|---|
| 5,631,971 A | 5/1997 | Sparrow | |
| 6,681,034 B1 | 1/2004 | Russo | |
| 7,142,699 B2 * | 11/2006 | Reisman et al. | 382/124 |
| 7,236,617 B1 * | 6/2007 | Yau et al. | 382/125 |
| 7,400,749 B2 * | 7/2008 | Hillhouse | 382/124 |
| 2004/0199775 A1 * | 10/2004 | Ser et al. | 713/186 |
| 2004/0218791 A1 * | 11/2004 | Jiang et al. | 382/124 |
| 2005/0084143 A1 * | 4/2005 | Kramer et al. | 382/125 |
| 2005/0232473 A1 * | 10/2005 | Liu | 382/124 |
| 2006/0120578 A1 * | 6/2006 | Shatford | 382/125 |
| 2006/0129838 A1 * | 6/2006 | Chen et al. | 713/186 |

OTHER PUBLICATIONS

Cucinotta, T., et al., "Hybrid Fingerprint Matching on Programmable Smart Cards," 1st International Conference on Trust and Privacy (TrustBus 2004), Zaragoza, Spain, Aug. 30-Sep. 1, 2004, pp. 232-241.

"Information Technology—Biometric Data Interchange Formats—Part 2: Finger Minutiae Data," Reference No. ISO/IEC FDIS 19794-2:2005(E), 50 pages.

International Search Report, in connection with PCT/SG2008/000258, mailed Nov. 5, 2008, 2 pages.

Written Opinion of the International Searching Authority, in connection with PCT/SG2008/000258, mailed Nov. 5, 2008, 3 pages.

* cited by examiner

*Primary Examiner* — Li Liu
(74) *Attorney, Agent, or Firm* — Fliesler Meyer LLP

(57) ABSTRACT

Embodiment of the invention provide a method and a device for determining a similarity value between a first template and a second template. A first cluster characteristic for each first cluster of a plurality of first clusters is determined, wherein each first cluster includes a plurality of first minutiae comprised in the first minutiae template. A second cluster characteristic for each second cluster of a plurality of second clusters is determined, wherein each second cluster includes a plurality of second minutiae comprised in the second minutiae template. The similarity value between the first minutiae template and the second minutiae template is determined based on the first cluster characteristics and the second cluster characteristics.

22 Claims, 10 Drawing Sheets

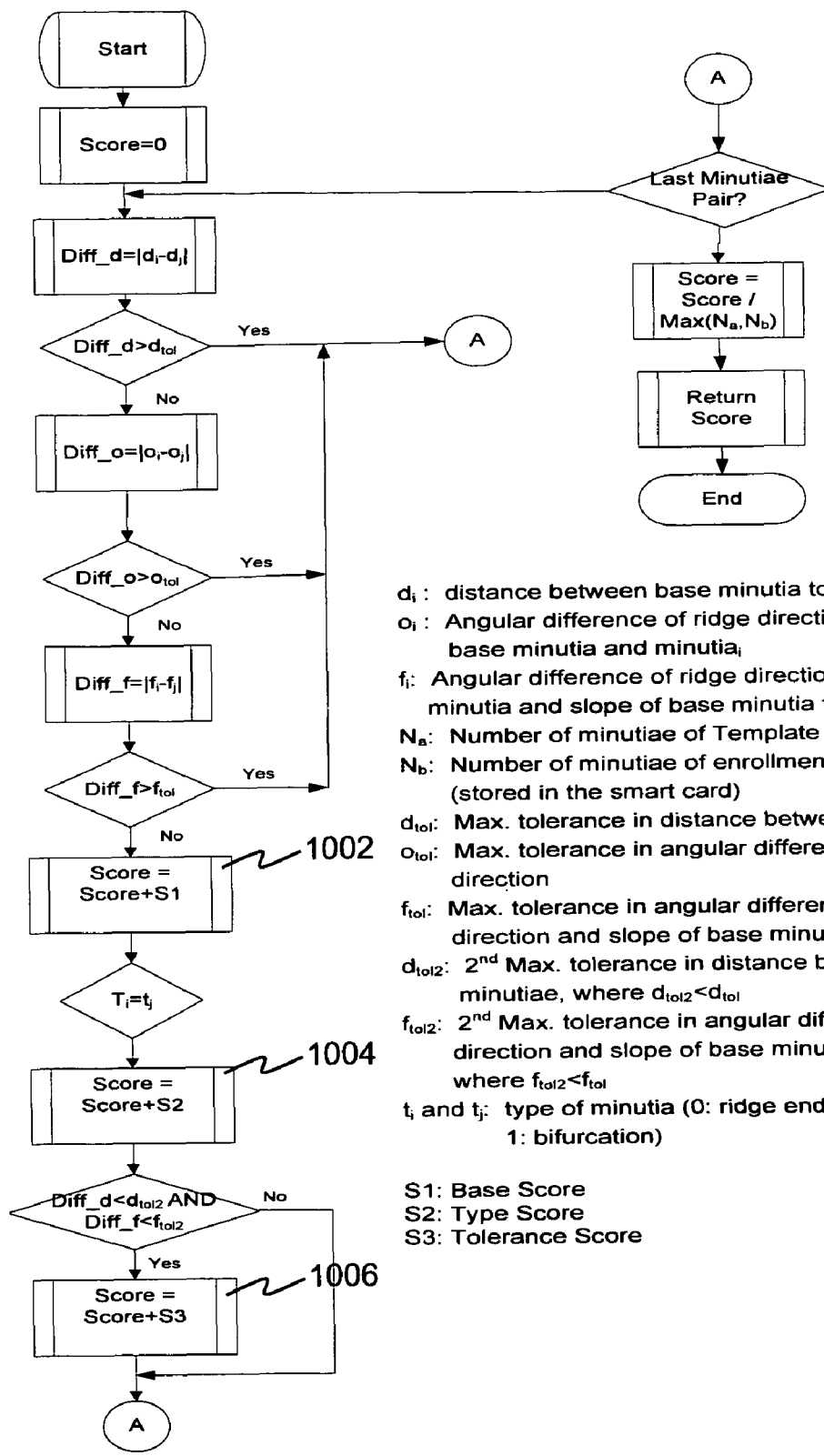

$d_i$ : distance between base minutia to minutia$_i$
$o_i$ : Angular difference of ridge direction between base minutia and minutia$_i$
$f_i$: Angular difference of ridge direction of base minutia and slope of base minutia to minutia$_i$
$N_a$: Number of minutiae of Template to be verified.
$N_b$: Number of minutiae of enrollment template (stored in the smart card)
$d_{tol}$: Max. tolerance in distance between minutiae
$O_{tol}$: Max. tolerance in angular difference of ridge direction
$f_{tol}$: Max. tolerance in angular difference of ridge direction and slope of base minutia and minutia$_i$.
$d_{tol2}$: 2$^{nd}$ Max. tolerance in distance between minutiae, where $d_{tol2}<d_{tol}$
$f_{tol2}$: 2$^{nd}$ Max. tolerance in angular difference of ridge direction and slope of base minutia and minutia$_i$, where $f_{tol2}<f_{tol}$
$t_i$ and $t_j$: type of minutia (0: ridge ending, 1: bifurcation)

S1: Base Score
S2: Type Score
S3: Tolerance Score

Fig. 10

METHOD AND DEVICE FOR DETERMINING A SIMILARITY VALUE BETWEEN MINUTIAE TEMPLATES

TECHNICAL FIELD

Embodiments relate generally to a method and a device for determining a similarity value between minutiae templates.

BACKGROUND

Biometrics information, such as fingerprint, has been used for verification of an identity. Resource-constrained platforms, for instance a smart card having a microprocessor and a memory, are increasingly used for controlling access to confidential information. Typically, the smart card has stored within its memory a biometric information sample of the authorized user of the smart card, for instance a fingerprint image or a minutiae template determined from the fingerprint. When the authorized user of the smart card requires access, the user provides a biometric information sample in the form of a fingerprint or a minutiae template for comparison with the stored fingerprint image or the stored minutiae template. If a match is determined, the user is identified and access is granted.

The fingerprint verification and identification algorithms can be classified into two categories: image-based and minutiae-based. Minutiae-based methods are currently one of the most widely used biometrics technologies for its high accuracy.

A token based fingerprint minutiae matching system usually includes two major components: a reader and a token. The reader may be used to read the fingerprint from a sensor to construct a minutiae template using the extracted minutiae from the fingerprint image. The template may then be sent to the token for enrolment or matching. Enrolment is the process of saving certified minutiae templates and user's information into the token by authorized personnel, and matching is the process to verify a person's fingerprint with the enrolment template stored in the token. The reader can be a PC or an embedded system with a communication unit. The token, which is usually a resource-constrained platform, can be a smart card, a USB token or e.g. another portable device, etc.

For enhanced security, the verification of the input fingerprint or minutiae template may be performed by the in-card processor, instead of the external card reader. This kind of verification is called Match-On-Card since the biometric verification is executed inside the smart card. The advantage of match-on-card is that the template of the authorized user (also referred to as the enrolment template) is not released as the verification is executed on-card.

In ordinary verification system such as a PC, the verification of minutiae templates is fast. However, for match-on-card, due to the limitation in the manufacturing and in the size, the resource constrained token usually does not provide sufficient processing power, and therefore the match-on-card is time-consuming.

There is a need to accelerate the matching of templates, such that a matching device having low-end processing power is able to perform the templates matching in a reasonable time period.

SUMMARY

An embodiment provides a method of determining a similarity value between a first template and a second template. A first cluster characteristic for each first cluster of a plurality of first clusters may be determined, wherein each first cluster includes a plurality of first minutiae comprised in the first minutiae template. A second cluster characteristic for each second cluster of a plurality of second clusters may be determined, wherein each second cluster includes a plurality of second minutiae comprised in the second minutiae template. The similarity value between the first minutiae template and the second minutiae template is determined based on the first cluster characteristics and the second cluster characteristics.

Another embodiment provides a device for determining a similarity value between a first template and a second template. The device may include a first cluster characteristic determination unit for determining a first cluster characteristic for each first cluster of a plurality of first clusters, wherein each first cluster includes a plurality of first minutiae comprised in the first minutiae template. The device may further include a second cluster characteristic determination unit for determining a second cluster characteristic for each second cluster of a plurality of second clusters, wherein each second cluster includes a plurality of second minutiae comprised in the second minutiae template. The device may further include a similarity determination unit for determining the similarity value between the first minutiae template and the second minutiae template based on the first cluster characteristics and the second cluster characteristics.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 10 shows a flowchart of determining the similarity value between a first minutiae template and a second minutiae template according to an embodiment.

DESCRIPTION

Various embodiments provide a computation efficient method of determining a similarity value between two minutiae templates in a faster speed.

Various embodiments accelerate the similarity determination based on a clustering approach, wherein the respective clusters of the templates are compared. Various embodiments also may accelerate the determination of a reference pair of matched minutiae based on the clustering approach for alignment of the templates. Various embodiments may further accelerate the similarity determination based on an adaptive load sharing scheme.

Figure 1:
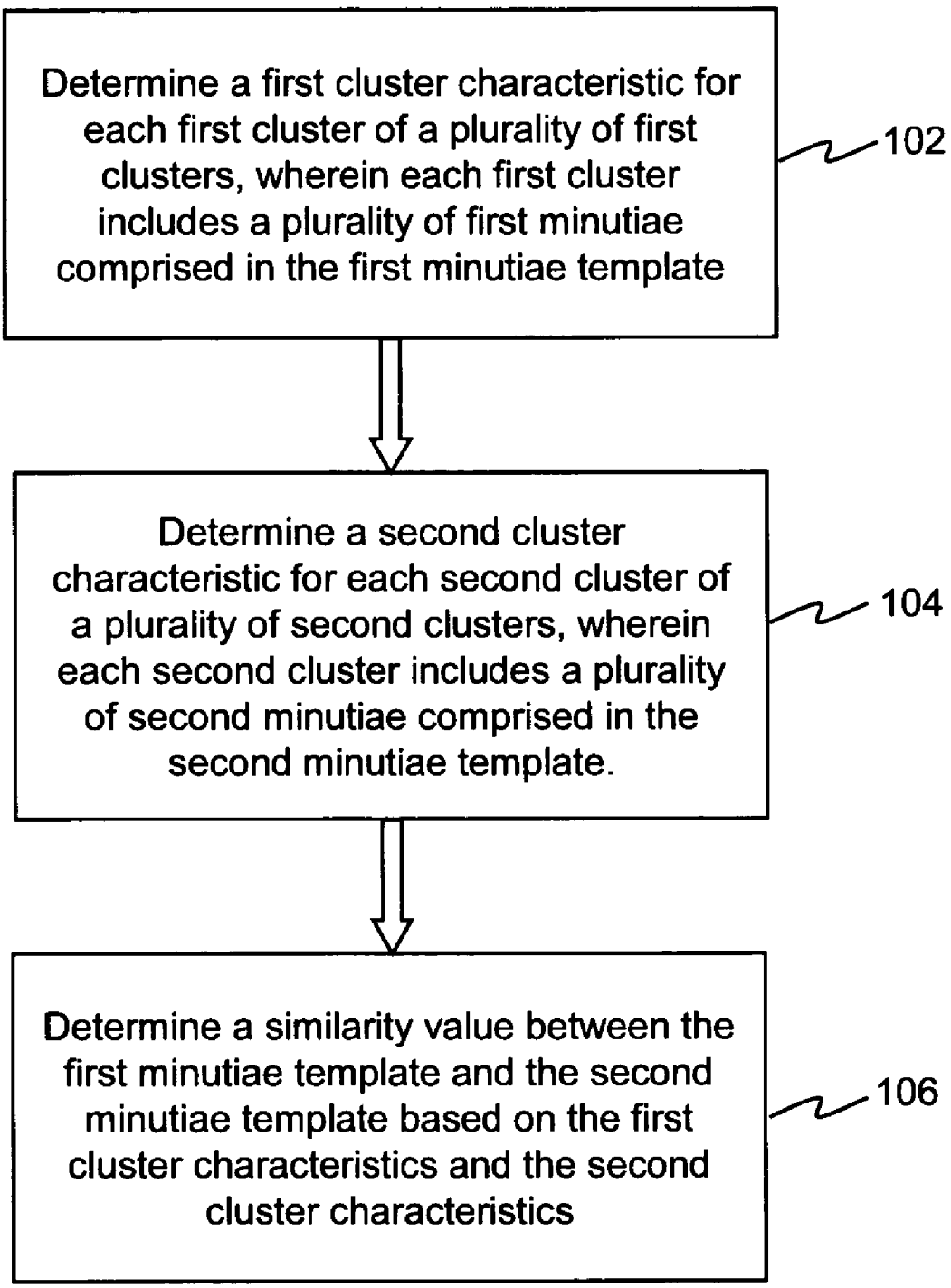
FIG. 1 shows a flowchart of determining a similarity value between a first minutiae template and a second minutiae template according to an embodiment.

FIG. 1 shows a flowchart of determining a similarity value between a first minutiae template and a second minutiae template according to an embodiment.

At 102, a first cluster characteristic for each first cluster of a plurality of first clusters is determined, wherein each first cluster includes a plurality of first minutiae comprised in the first minutiae template.

At 104, a second cluster characteristic for each second cluster of a plurality of second clusters is determined, wherein each second cluster includes a plurality of second minutiae comprised in the second minutiae template.

At 106, a similarity value between the first minutiae template and the second minutiae template is determined based on the first cluster characteristics and the second cluster characteristics.

Figure 2:
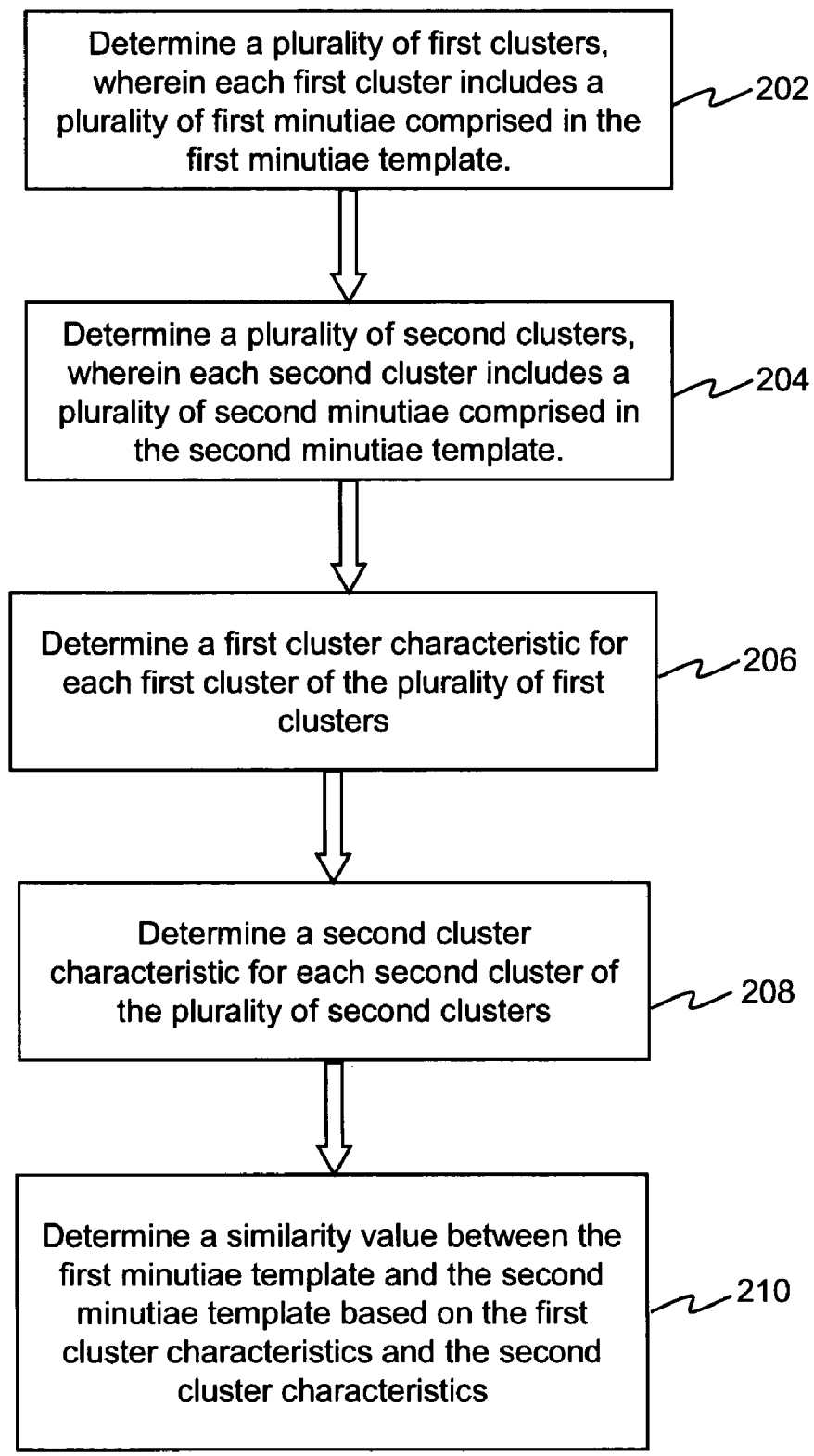
FIG. 2 shows a flowchart of determining a similarity value between a first minutiae template and a second minutiae template according to another embodiment.

FIG. 2 shows a flowchart of determining a similarity value between a first minutiae template and a second minutiae template according to another embodiment.

At 202, a plurality of first clusters is determined, wherein each first cluster includes a plurality of first minutiae comprised in the first minutiae template.

At 204, a plurality of second clusters is determined, wherein each second cluster includes a plurality of second minutiae comprised in the second minutiae template.

At 206, a first cluster characteristic for each first cluster of the plurality of first clusters is determined.

At 208, a second cluster characteristic for each second cluster of the plurality of second clusters is determined.

At 210, a similarity value between the first minutiae template and the second minutiae template is determined based on the first cluster characteristics and the second cluster characteristics.

In this context, the first minutiae template may be a template under verification, which may be detected by a fingerprint reader. The fingerprint reader may be a device including a fingerprint sensor, a processor and an interface for communicating with another device, such as a token storing a certified minutiae template. The second minutiae template may be an enrolment template, which is a user's minutiae template that is certified during enrolment. The second minutiae template may be used for authenticating a user, and may be stored in a secured device, such as a smart card.

The first minutiae template and the second minutiae template may include information of detected minutiae in a fingerprint. For example, ISO/IEC 19794-2: 2005 (Information technology—Biometric data interchange formats—Part 2: Finger minutiae data) defines minutiae data format, including the Cartesian coordinate, orientation angle and minutiae type of the minutiae in a fingerprint. This minutiae data format may be used as fingerprint minutia card format in matching of fingerprints. To further increase the accuracy of minutiae template matching using the minutiae information, the minutiae template may also include extra information of the fingerprint, such as core location, ridge frequencies and minutiae orientation.

In an embodiment, each minutia $m_i$ may be represented by a vector $M_i$:

$$M_i = (x_{mi}, y_{mi}, t_{mi}, \theta_{mi}, l_{k1}, \Delta N_{k1}, \Delta D_{k1}, \Delta\tau_{k1})^T$$

wherein

| | |
|---|---|
| $x_{mi}$ = | x coordinate of minutiae |
| $y_{mi}$ = | y coordinate of minutiae |
| $t_{mi}$ = | minutia type (Ridge End or Bifurcation) |
| $\theta_{mi}$ = | minutia orientation angle, |
| $l_{kl}$ = | index of the nearest neighbour |
| $\Delta N_{kl}$ = | number of ridges between nearest minutiae. |
| $\Delta D_{kl}$ = | relative distance between nearest minutiae. |
| $\Delta\tau_{kl}$ = | relative orientation angle between nearest minutiae. |

For each minutia, it is possible to use more than one nearest neighbour. For example, if three nearest neighbours are used, the vector for each minutia $m_i$ becomes:

$$M_i = (x_{mi}, y_{mi}, t_{mi}, \theta_{mi}, l_{k1}, \Delta N_{k1}, \Delta D_{k1}, \Delta\tau_{k1}, l_{k2}, \Delta N_{k2}, \Delta D_{k2}, \Delta\tau_{k2}, l_{k3}, \Delta N_{k3}, \Delta D_{k3}, \Delta\tau_{k3})^T$$

wherein $l_{k1}$ is the index of the nearest minutia to $m_i$, and $l_{k2}$ and $l_{k3}$ are the second and the third nearest neighbour of $m_i$.

The minutiae of the first minutiae template and the second minutiae template may be grouped into a plurality of first clusters and a plurality of second clusters as described in FIGS. 1 and 2 above.

The determination of the first clusters and the second clusters may be carried out by any available clustering method or algorithm. In an embodiment, the determination of the first clusters and the second clusters is carried out using the relative distance graph with a threshold distance T, between the nearest minutiae.

In an embodiment, the centroids of the first clusters of the first template may be linked into a first relative distance graph representing the first cluster linking information, and the centroids of the second clusters of the second template may be linked into a second relative distance graph representing the second cluster linking information. The relative distance graph is described in FIG. 3 below, which is the link among the nearest neighbour of cluster centroids.

Figure 3:
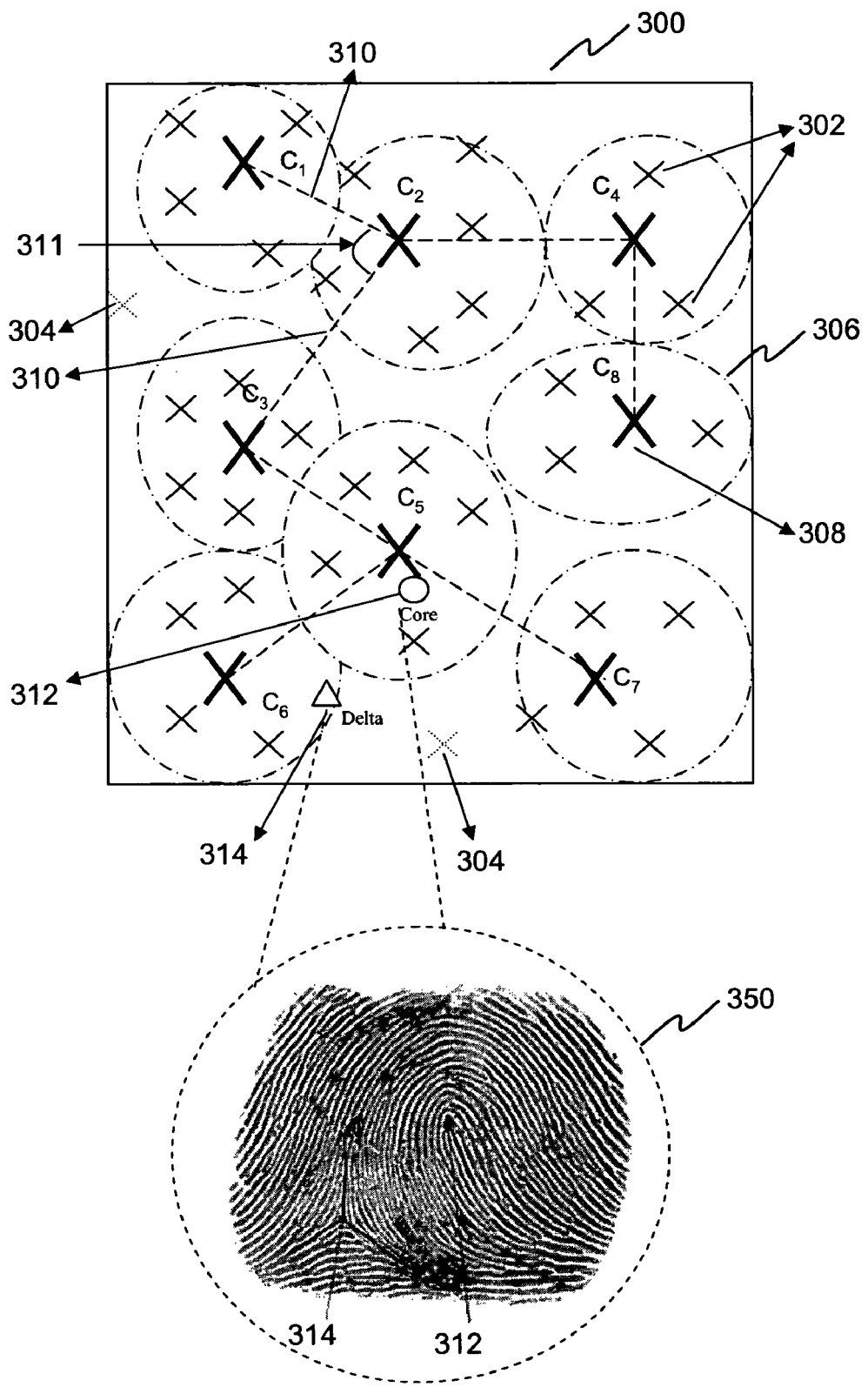
FIG. 3 shows a minutiae template including a plurality of minutiae.

FIG. 3 shows a template 300 including a plurality of minutiae.

The template 300 may be an input template to be verified, or an enrolment template of a certified user. The template 300 includes a plurality of minutiae 302, 304 detected from a fingerprint. A plurality of clusters 306 are determined, such that each cluster 306 includes a plurality of minutiae 302 which are determined to be grouped into the respective clusters 306. For example, minutiae having a relative distance from its nearest minutia less than a threshold distance T are grouped into one cluster.

There may be some minutiae 304 not being grouped into one of the clusters 306 as they do not fulfill the requirement that the relative distance is less than the threshold distance T. These ungrouped minutiae 304 may be assigned to the nearest cluster 306. For example, a centroid $C_N$ 308 is determined for each cluster 306 of minutiae. The ungrouped minutiae 304 are grouped into the cluster whose centroid 308 is nearest to the ungrouped minutiae 304.

The centroids 308 of the clusters 306 may be linked by a relative distance graph based on the relative distance information of the centroids 308. As shown in FIG. 3, the dotted line 310 indicates the linking of each centroid 308 to its neastest neighbour centroid 308 by relative distance graph. In the relative distance graph, the inner angle information, also referred to as interior angle information, among centroids 308 of the clusters may be determined. As shown in FIG. 3, the inner angle 311 of the centroid $C_2$ 308 is illustrated, which is the angle between the centroid link 310 of $C_1$-$C_2$ and the centroid link 310 of $C_2$-$C_3$. By having the relative information between the clusters as illustrated by the relative distance graph, the graph matching may be used in the determination of similarity value between the minutiae templates. In an embodiment, the relative distance information of controids and/or the inner angle information in the relative distance graph may provide a cluster-level information of the minutiae template and may be used in the determination of the similarity value between minutiae templates.

The template 300 may also include a fingerprint core 312 and a fingerprint delta 314 detected from the fingerprint, which may be used in the matching of the minutiae template 300. A fingerprint core 312 is the central point within the inner most recurving ridge of the fingerprint, and is normally located in the middle of the fingerprint. A fingerprint delta 314 is a point where two ridge lines run side by side and diverge with a significant recurving line that passes in front of the delta point, i.e. the point at the center of divergence of three ridge lines. An example of fingerprint core 312 and fingerprint delta 314 is shown in a fingerprint 350 of FIG. 3. Depending on the types of the fingerprint pattern, the fingerprint and the template 300 extracted therefrom may include different numbers of cores and deltas. The core 312 and delta 314 are the significant features of a fingerprint, and are widely used for fingerprint matching.

The cluster characteric determined for each cluster in FIGS. 1 and 2 above may include information about the cluster and about the minutiae grouped into the cluster.

In an embodiment, the cluster characteristic may include information about the shape of each cluster. For example, the information about the convex hull of each cluster and/or information about the position about the centroid of each cluster may be determined.

In another embodiment, the cluster characteristic includes information about the size of each cluster, e.g. the area of the each cluster.

The cluster characteristic may also include information about the minutiae included in each cluster. The information about the minutiae may include at least one of the following information elements: a number of the minutiae included in each cluster, a density of the minutiae included in each cluster, an average ridge number between two adjacent minutiae in each cluster, position of a fingerprint core, number of fingerprint cores in each cluster, position of a fingerprint delta, and number of fingerprint deltas in each cluster.

In an embodiment, information included in the cluster characteristic may be represented as the following components:

the convex hull of clusters (i.e. the boundary of clusters)
the number of minutiae inside the convex hull: $N_{CH}$
minutiae density of the convex hull: $D_{CH}=N_{CH}/\text{Area}$
average ridge number between minutiae $A_{RN}=\Delta N/N_{CH}$
number of core/delta inside the convex hull: $N_{CD}$
position of core: $P_{core}$ (In Cartesian coordinate, $(X_{core}, Y_{core})$)
position of delta: $P_{delta}$ (In Cartesian coordinate, $(X_{delta}, Y_{delta})$)
the centroid of the cluster: $(C_X, C_Y)$ Some of the above parameters may be written in vector form: $CIV=(N_{CH}, D_{CH}, A_{RN}, N_{CD}, P_{core}, P_{delta})^T$, wherein CIV is referred to as cluster information vector.

In an embodiment, the relative distance of the centroid of cluster may be calculated after calculation of the convex hull and CIV. The relative distance of the controid of cluster may be used in the determination of similarity value between the two templates in an embodiment which will be described in a later portion. As described above, some minutiae, which are not grouped in a cluster for failing to meet the threshold distance criterion, may be assigned to the cluster with the nearest centroid. Accordingly, for those clusters with extra ungrouped minutiae added in the clusters, the above parameters including the convex hull, the CIV and the centroid may be recalculated, but the re-calculating process is fast.

If a cluster includes any core or delta detected, the position of core or delta will be assigned to the CIV. Otherwise, a "null" will be assigned to $P_{core}$ or $P_{delta}$ to indicate that there is no core or delta included in the cluster.

The first clusters and the second clusters of the first template and the second template may be saved with the respective CIV, which is the descriptor of the properties of the respective cluster. Since the cluster characteristics as represented by CIV include information about the minutiae, the similarity value between the first minutiae template and the second minutiae template may be determined based on difference between the first cluster characteristics and the second cluster characteristics of the two minutiae templates.

Figure 4:
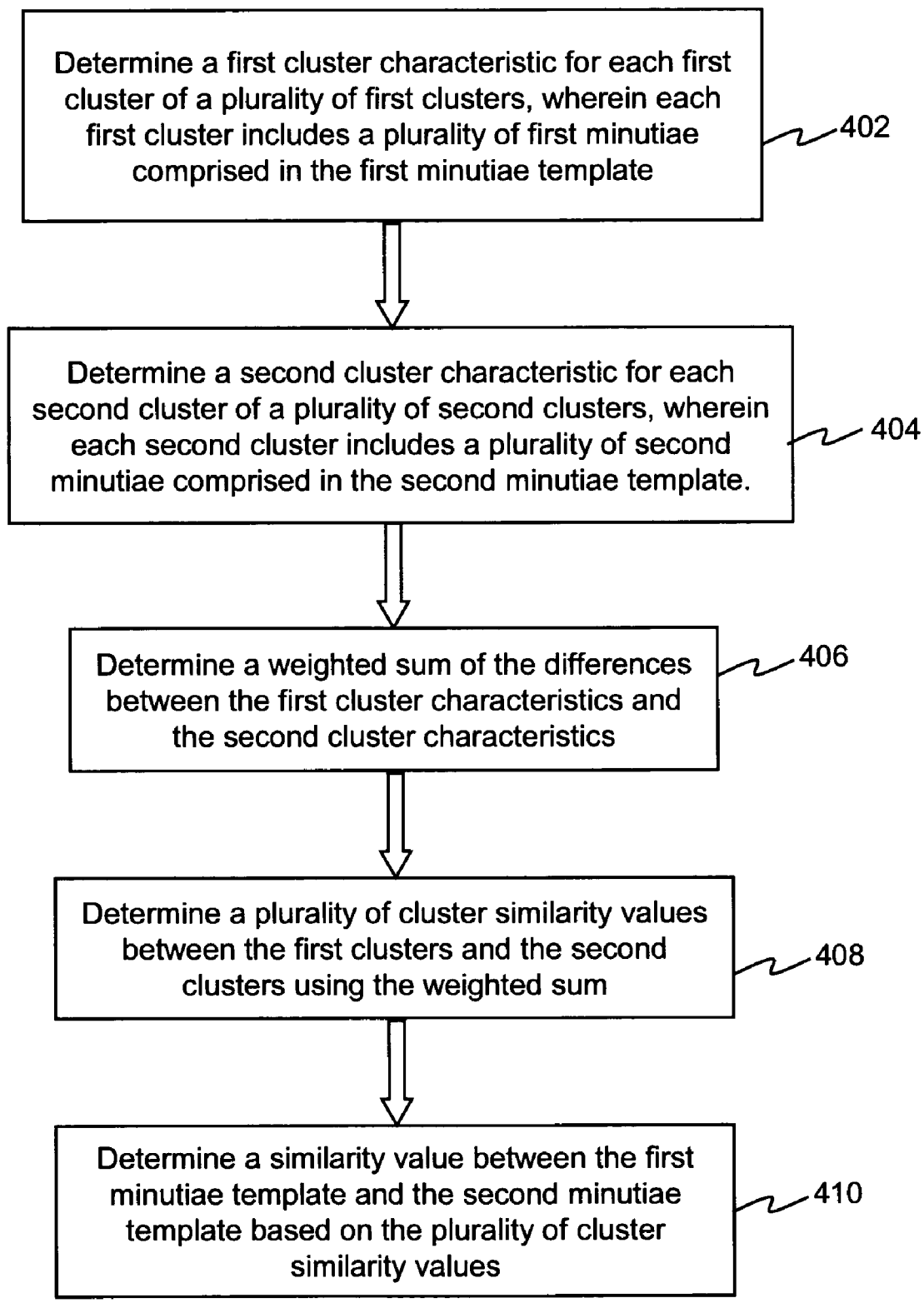
FIG. 4 shows a flowchart of determining a similarity value between a first minutiae template and a second minutiae template according to an embodiment.

FIG. 4 shows a flowchart of determining a similarity value between a first minutiae template and a second minutiae template according to an embodiment.

At 402, a first cluster characteristic for each first cluster of a plurality of first clusters is determined, wherein each first cluster includes a plurality of first minutiae comprised in the first minutiae template.

At 404, a second cluster characteristic for each second cluster of a plurality of second clusters is determined, wherein each second cluster includes a plurality of second minutiae comprised in the second minutiae template.

At 406, a weighted sum of the differences between the first cluster characteristics and the second cluster characteristics is determined.

At 408, a plurality of cluster similarity values between the first clusters and the second clusters are determined using the weighted sum.

At 410, a similarity value between the first minutiae template and the second minutiae template is determined based on the plurality of cluster similarity values.

In accordance with an embodiment, by determining a plurality of clusters for each minutiae template and comparing the difference between the respective cluster characteristics, the determination of the similarity value between the first minutiae template and the second minutiae template may be speeded up, thereby achieving a fast authentication of an input template.

The determination of the plurality of cluster similarity values at 408 is described in detail below.

Let $CIV^1$ and $CIV^2$ represent the cluster information vectors of the first minutiae template and the second minutiae template, respectively. The first template may be an input template to be verified, and the second template may be an enrolment template which has been certified.

The element of $CIV^1$ is the cluster information vector $CIV^i$ of the respective first cluster of the first minutiae template, and the element of $CIV^2$ is the cluster information vector $CIV^j$ of the respective second cluster of the second minutiae template, wherein $$CIV^i = (N^i_{CH}, D^i_{CH}, A^i_{RN}, N^i_{CD}, P^i_{core}, P^i_{delta})^T;$$

$$CIV^j = (N^j_{CH}, D^j_{CH}, A^j_{RN}, N^j_{CD}, P^j_{core}, P^j_{delta})^T.$$

The cluster similarity value may be determined by calculating the error of $CIV^i$ and $CIV^j$. The error $E_{ij}$ may be determined using a weighed sum of difference of the respective cluster characteristic according to the function $E_{ij}=\text{Diff}(CIV^i, CIV^j)$, i.e.

$$E_{ij}=\alpha \cdot \text{Diff}(N^i_{CH}, N^j_{CH})+\beta \cdot \text{Diff}(D^i_{CH}, D^j_{CH})+\gamma \cdot \text{Diff}(A^i_{RN}, A^j_{RN})+\delta \cdot \text{Diff}(N^i_{CD}, N^j_{CD})$$

wherein Diff(a, b) is a function to calculate the error/difference of the two components a and b. The difference of the two components can be any type of error between the two components, such as absolute difference |a−b|, or square error $(a-b)^2$. $\alpha$, $\beta$, $\gamma$ and $\delta$ are weighting coefficients, and the sum of these weighting coefficients are equal to 1.

In an embodiment, the clusters with fingerprint core or delta information will be compared first, since the fingerprint core or delta information may be unique features to match two clusters.

If the first template includes N clusters and the second template includes M clusters, a cluster error vector (CEV) can be determined as:

$$CEV = (E_{11}, E_{12}, \ldots, E_{21}, E_{22}, \ldots, E_{N1}, E_{N2}, \ldots, E_{NM})^T$$

wherein CEV include the errors of all the combinations of the CIVs from the two templates.

The above vector CEV may include the respective cluster difference of two clusters from the two minutiae templates, which on the other hand represent the similarity value of the two clusters being compared. It is understood that for the cluster pairs having a lower error $E_{ij}$, the clusters have a higher similarity cluster value and therefore have a high chance that the two clusters are matched. In an embodiment, the element of CEV, i.e. the respective error $E_{ij}$, may be arranged in ascending order, so that the pairs of clusters which have higher chance of being matched are ordered first. Those pairs of clusters which are ordered first and having similar CIVs are compared first during the template verification. The determination of similarity value between the two templates by the cluster-to-cluster approach compares the characteristics of small clusters instead of the whole templates, thereby achieving a fast matching speed. In an experiment using FVC 2000 ST database and using the cluster-to-cluster approach as described above, the maximum number of determined clusters is 10. Since the number of clusters is not high, the determination of similarity value between the two templates using the cluster-to-cluster approach is fast.

In another embodiment, if the smallest error $E_{ij}$ in CEV is larger than a predetermined value, the two templates have un-matched CIVs and thus the cluster information will be ignored.

This may correspond to two situations:
(1) the two minutiae templates are totally different as they belong to different fingers; and
(2) the two minutiae templates are taken from the same finger but the overlapping regions are small.

In this case, determining the similarity value between two minutiae templates based on the cluster characterics may not be speed up. All the minutiae in the templates may be grouped into a single cluster for matching of the two templates.

In another embodiment, the method of determining the similarity value may further include determining a first relative distance information for the plurality of first clusters and determining a second relative distance information for the plurality of second clusters. The first relative distance information may include relative distance between nearest centorids of the plurality of first clusters, and the second relative distance information may include relative distance between nearest centorids of the plurality of second clusters.

The determination of the similarity value between the first minutiae template and the second minutiae template may further include determining a weighted sum of the differences between the first relative distance information and the second relative distance information. By comparing the first relative distance information and the second relative distance information, a cluster-level matching information is determined, which may be used in the determination of the similarity value between the two templates, e.g. as a weighted component of the similarity value.

Using the determined first and second relative distance information, the centroids of the plurality of first clusters may be linked by a first relative distance graph, and the centroids of the plurality of second clusters may be linked by a second relative distance graph. In another embodiment, the inner angle of the first relative distance graph and the inner angle of the second relative distance graph may be determined. The determination of the similarity value between the first minutiae template and the second minutiae template may include determining a weighted sum of the differences between the first relative distance information and the second relative distance information and the differences between the inner angles of the first graph and the second graph.

The determination of a cluster similarity value of the respective clusters from the two templates as described above may determine a plurality of matched clusters, which may be used to determine pairs of matched minutiae from the two templates in a fast speed as will be described in the following.

Figure 5:
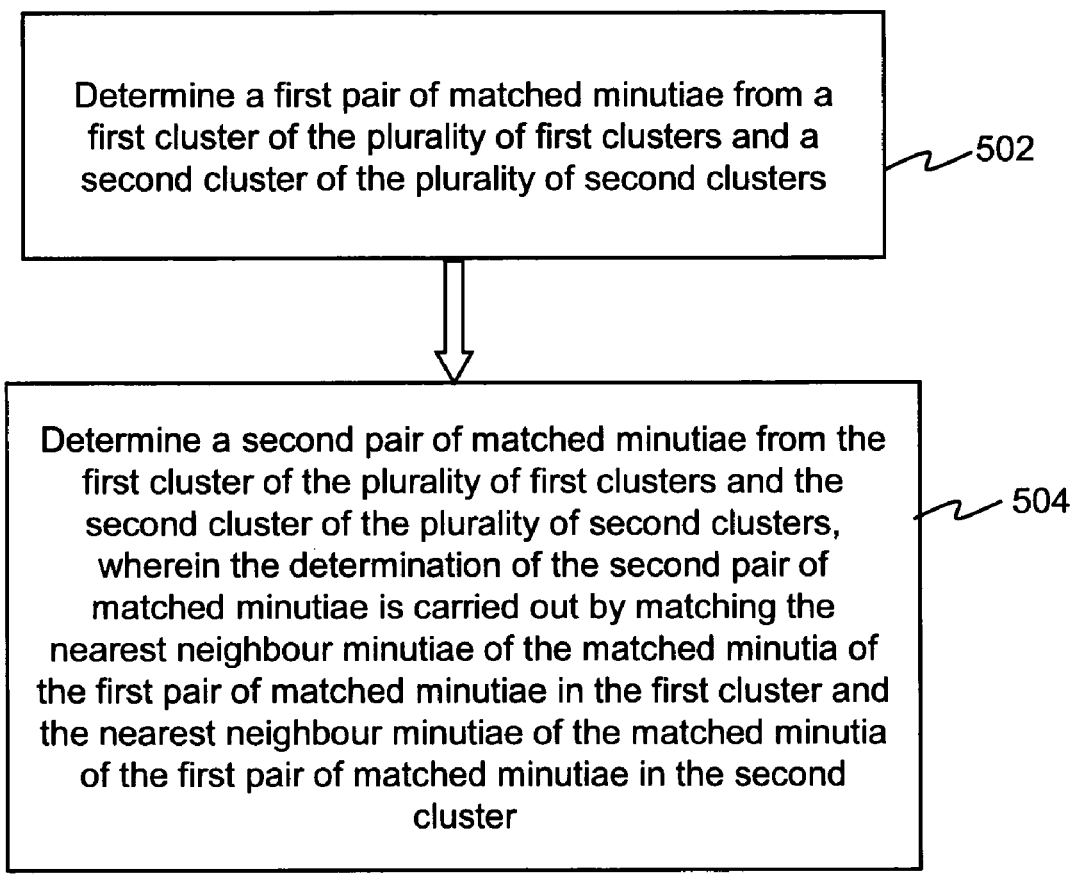
FIG. 5 shows a flowchart of determining pairs of matched minutiae from a first template and a second template according to an embodiment.

FIG. 5 shows a flowchart of determining pairs of matched minutiae from a first template and a second template according to an embodiment.

At 502, a first pair of matched minutiae is determined from a first cluster of the plurality of first clusters and a second cluster of the plurality of second clusters.

At 504, a second pair of matched minutiae is determined from the first cluster of the plurality of first clusters and the second cluster of the plurality of second clusters, wherein the determination of the second pair of matched minutiae is carried out by matching the nearest neighbour minutiae of the matched minutia of the first pair of matched minutiae in the first cluster and the nearest neighbour minutiae of the matched minutia of the first pair of matched minutiae in the second cluster.

In an embodiment, the first pair of matched minutiae may be determined by matching the minutiae in the first cluster and the second cluster which have the minimum difference between their cluster characterics as described in the embodiments above. Since the first cluster and the second cluster have the minimum difference, the chance of determining a pair of matched minutiae within the first cluster and second cluster is high and therefore fasten the process of determining the first pair of matched minutiae.

According to an embodiment, at 504, the second pair of matched minutiae may be determined by matching the nearest neighbour minutiae of the first pair of matched minutiae. It is noted that the determination of pairs of matched minutiae may be continued to determine further pairs of matched minutiae. For example, a third pair of matched minutiae may be determined by matching the nearest neighbour minutiae of the second pair of matched minutiae, and so on. This may be referred to as minutiae propagation matching in this context, and will be explained in more detail below.

During the construction of the first template and the second template, the indexes of each minutia's nearest neighbours are encoded inside the template as mentioned in the representation vector of each minutia above. Once a pair of matched minutiae is determined, the matched pair can be treated as an initial condition to search for its nearest neighbours. Hence, the determination of subsequent pairs of matched minutiae can be accelerated.

Figure 6:
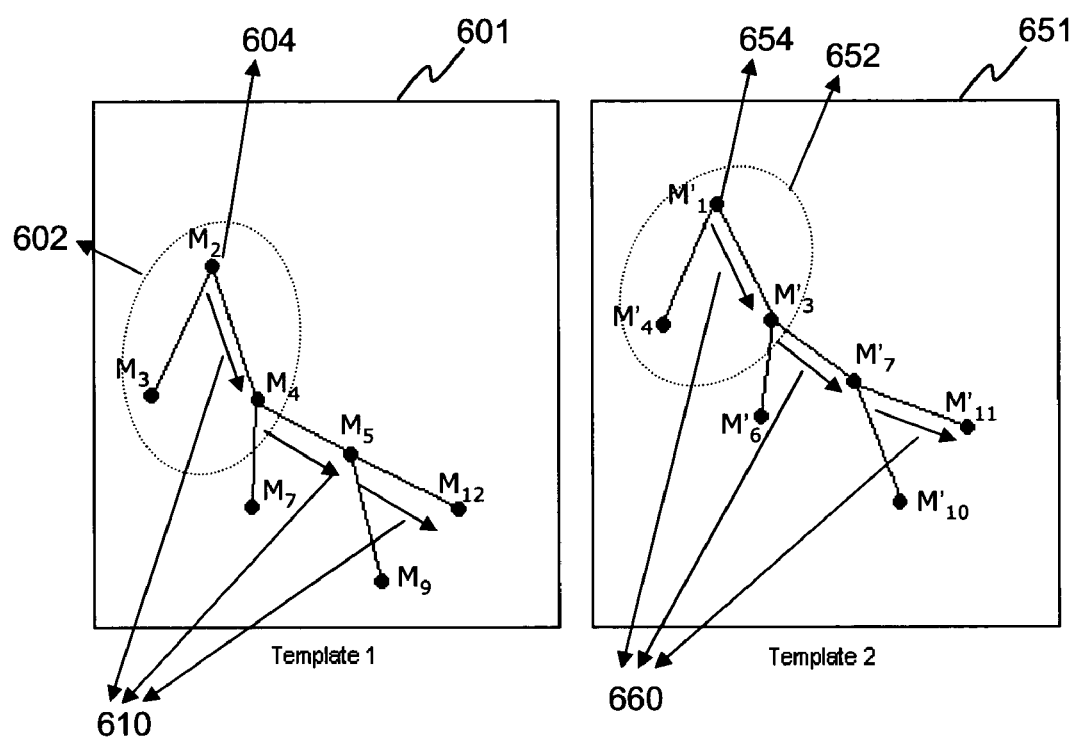
FIG. 6 shows the determination of pairs of matched minutiae from a first template and a second template according to an embodiment.

FIG. 6 shows the determination of pairs of matched minutiae from a first template and a second template according to an embodiment.

In FIG. 6, template 1 may be an enrolment template 601 and template 2 may be an input template 651 for verification. From a pair of cluster 602, 652 which has the maximum cluster similarity value, a first pair of matched minutiae 604, 654 may be determined, i.e. $M_2$ 604 may be matched with $M'_1$ 654.

The nearest neighbour minutiae $M_4$ and $M_3$ of the matched minutia 604 in the first cluster 602 may be matched with the nearest neighbout minutiae $M'_3$ and $M'_4$ of the matched minutia 654 in the second cluster 652. It is determined that the link $M_2 \rightarrow M_4$ are matched with $M'_1 \rightarrow M'_3$, and the link $M_2 \rightarrow M_3$ are matched with $M'_1 \rightarrow M'_4$. There are two matched links for $M_2$ and $M'_1$, and the matched link with lowest matching error is determined to be the second pair of matched minutiae. In this example, $M_4$ and $M'_3$ may be determined to be the second pair of matched minutiae and may be used as the starting pair for next propagation matching. The arrows 610, 660 in FIG. 6 shows how the matching propagates from minutia to minutia using nearest neighbours. From the second pair of matched minutiae $M_4$ and $M'_3$, further pairs of matched minutiae are determined: $M_4 \rightarrow M_5$ matched with $M'_3 \rightarrow M'_7$, and $M_4 \rightarrow M_7$ matched with $M'_3 \rightarrow M'_6$. The process can be continued until one of the following termination criteria is met:

1) No more matched minutiae are found.
2) The number of propagation exceeds a predetermined maximum number of propagation.
3) A loop is found.
4) No more un-matched minutia is found for the matching in the template.

As the nearest neighbour is used for minutiae propagation in the sub-graph, the chosen neighbour may branch back to the matched link and thereby causes a dead loop. After every matching of minutiae, a check with the matched index may be provided to avoid the loop. If a loop is discovered and no more matched pair is found, the determination process may be terminated. Otherwise, the process can continue using another pair which is not in the pervious matched list.

Figure 7:
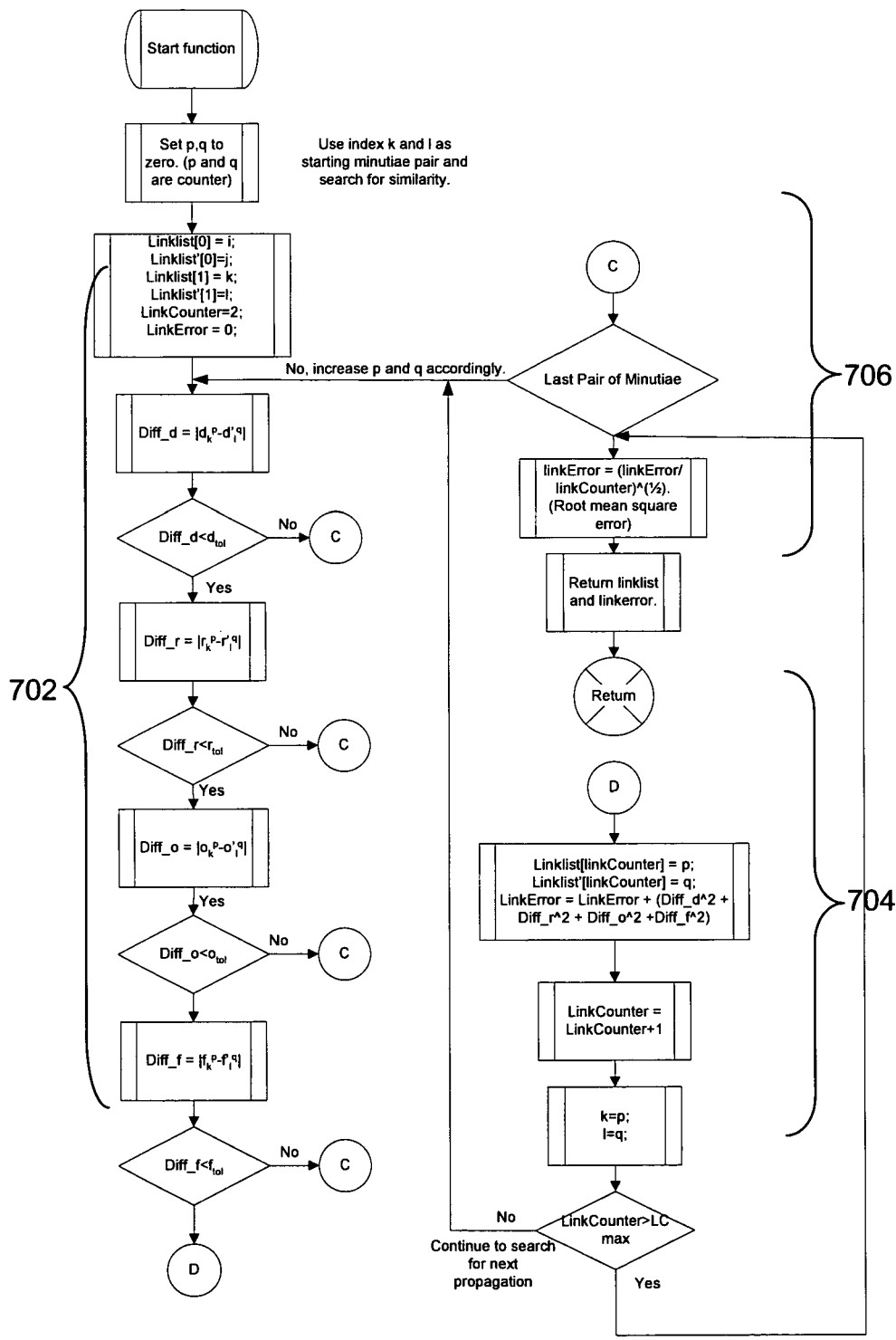
FIG. 7 shows a flowchart of minutiae propagation matching according to an embodiment.

FIG. 7 shows a flowchart of minutiae propagation matching according to an embodiment.

The flowchart corresponds to a minutiae propagation function to determine a link of matched minutiae: minutiae_propagation_function (i, j, k, l). The function returns a link of matched minutiae and the root mean square error of the matching for each pair of matched minutiae.

In FIG. 7, the minutiae propagation function may be initialised with the first pairs of matched minutiae. The absolute difference may be used to examine the parameters of nearest neighbour minutiae.

The parameters of the minutiae from the enrolment template and the input template are illustrated as follows:

---

Enrolment Template:
$M_n^k = (d_n^k, r_n^k, o_n^k, f_n^k)T$;
wherein n: index of minutiae, k: index of nearest neighbour of minutiae n.
Input Template:
$M'_n^k = (d'_n^k, r'_n^k, o'_n^k, f'_n^k)T$;
where n: index of minutiae, k: index of neighbour of minutiae n, sorted in distance.
d - Distance between two minutiae.
r - Number of ridges between two minutiae.
o - Angular difference of ridge direction between two minutiae.
f - Angular difference of ridge direction of minutiae n and slope of minutiae n to k.

---

The nearest neighbour minutiae of the first pair of matched minutiae may be compared in 702 using the absolute difference between the parameters of the minutiae to find a further pair of matched minutiae satisfying the criteria:

$$\text{Diff}\_d < d_{TOL}, \text{Diff}\_r < r_{TOL}, \text{Diff}\_o < o_{TOL}, \text{and Diff}\_f < f_{TOL},$$

wherein $d_{TOL}$, $r_{TOL}$, $o_{TOL}$, $f_{TOL}$ is the respective tolerance values for d, r, o, f.

The comparison of the parameters of the minutiae above may use other difference calculation, such as the square error in other embodiments.

Once a matched pair is found, the matched pair will be appended in the linklist array together with the root mean square error of the matched parameters at 704. The minutiae propagation continues until one of the termination criteria above is met.

If no matched pair is found after comparing all the pairs of minutiae, the minutiae propagation function will be terminated at 706.

Once the minutiae propagation function is completed, the function will return the matched propagation minutiae list (Linklist[ ]), the errors of matched minutiae (linkError[ ]) and linkCounter (number of linked matched pairs).

Figure 8:
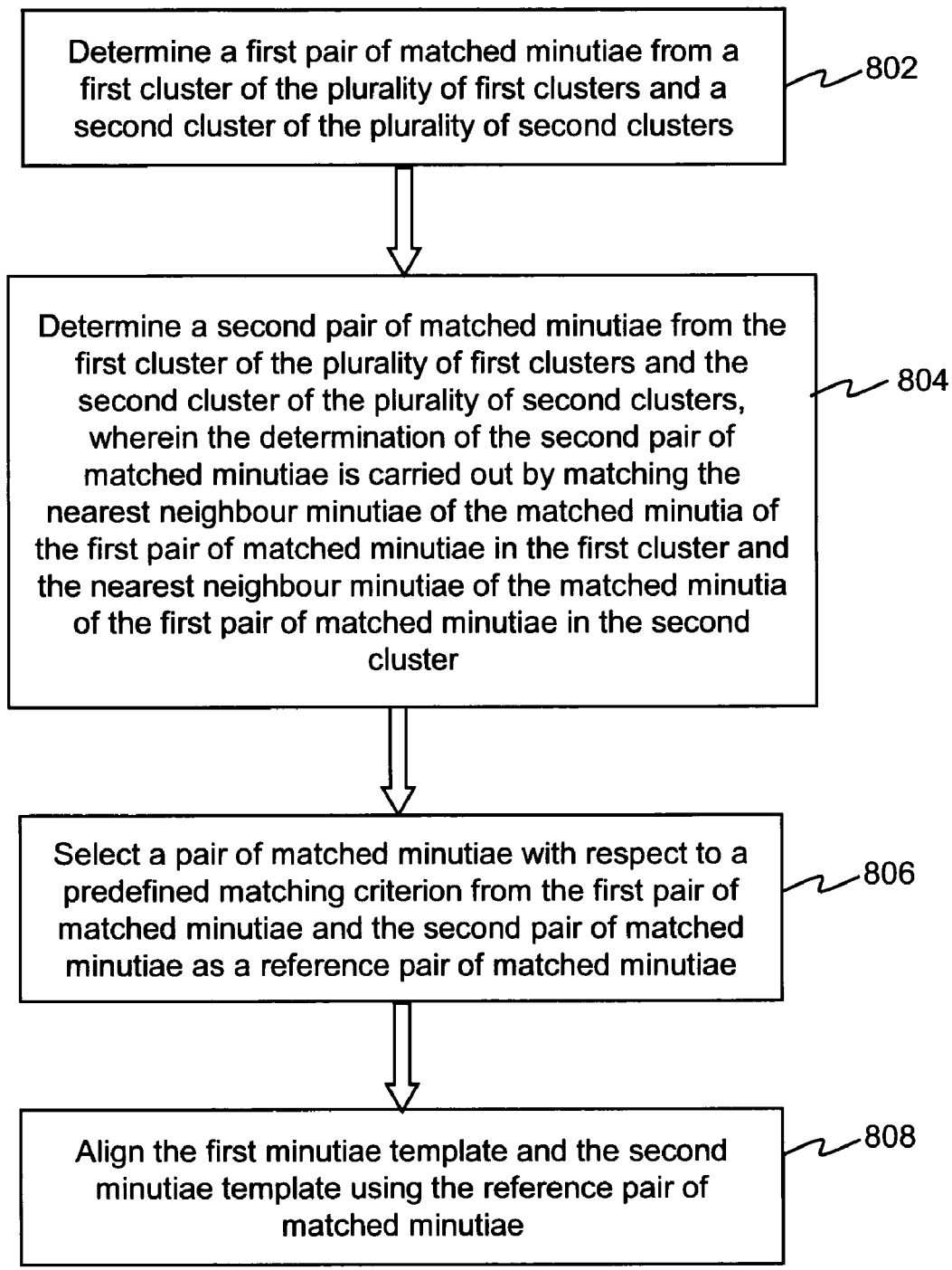
FIG. 8 shows a flowchart of determining a similarity value between a first minutiae template and a second minutiae template according to an embodiment.

FIG. 8 shows a flowchart of determining a similarity value between a first minutiae template and a second minutiae template according to an embodiment.

At 802, a first pair of matched minutiae is determined from a first cluster of the plurality of first clusters and a second cluster of the plurality of second clusters.

At 804, a second pair of matched minutiae is determined from the first cluster of the plurality of first clusters and the second cluster of the plurality of second clusters, wherein the determination of the second pair of matched minutiae is carried out by matching the nearest neighbour minutiae of the matched minutia of the first pair of matched minutiae in the first cluster and the nearest neighbour minutiae of the matched minutia of the first pair of matched minutiae in the second cluster.

At 806, a pair of matched minutiae is selected with respect to a predefined matching criterion from the first pair of matched minutiae and the second pair of matched minutiae as a reference pair of matched minutiae.

At 808, the first minutiae template and the second minutiae template are aligned using the reference pair of matched minutiae.

The determination of the first pair of matched minutiae may be carried out by comparing the minutiae in the first cluster of the plurality of first clusters in the first minutiae template and the minutiae in the second cluster of the plurality of second clusters in the second minutiae template.

As described in the embodiments above, the minutiae in the first minutiae template and in the second minutiae template may be grouped into a plurality of first clusters and a plurality of second clusters. The cluster characteristics of the respective first clusters and the respective second clusters may be determined and compared to determine the respective cluster similarity value for each pair of clusters from the first minutiae template and the second minutiae template. The respective pairs of clusters from the first minutiae template and the second minutiae template may be ordered based on the cluster similarity value. The first pair of matched minutiae may be determined from the minutiae comprised in the pair of clusters having the highest similarity value or lowest error.

After the first pair of matched minutiae is determined at 802, the second pair of matched minutiae may be determined at 804 according to the minutiae propagation as described in FIGS. 6 and 7 above. It is to be noticed that further pairs of matched minutiae may be determined at 804 as well, so that a link of pairs of matched minutiae is determined.

From the first pair of matched minutiae and the second pair of matched minutiae, a pair of matched minutiae is selected with respect to the predefined matching criterion as the reference pair of matched minutiae. In this context, the reference pair of matched minutiae is also referred to as the base matched minutiae or as the best matched minutiae, which may be used as the reference or the base for the matching and/or alignment of two minutiae templates. The predefined matching criterion may be the minimum matching error of the matched minutiae. In this regard, the reference pair of matched minutiae may be selected from a plurality of matched minutiae if at 804 a plurality of matched minutiae is determined. In this embodiment, the reference pair of matched minutiae is the best matching pair, since this pair has the minimum matching error.

The first minutiae template and the second minutiae template are aligned using the reference pair of matched minutiae, so that the matching of the aligned templates may be carried out to determine a similarity value of the two templates according to an embodiment.

Figure 9:
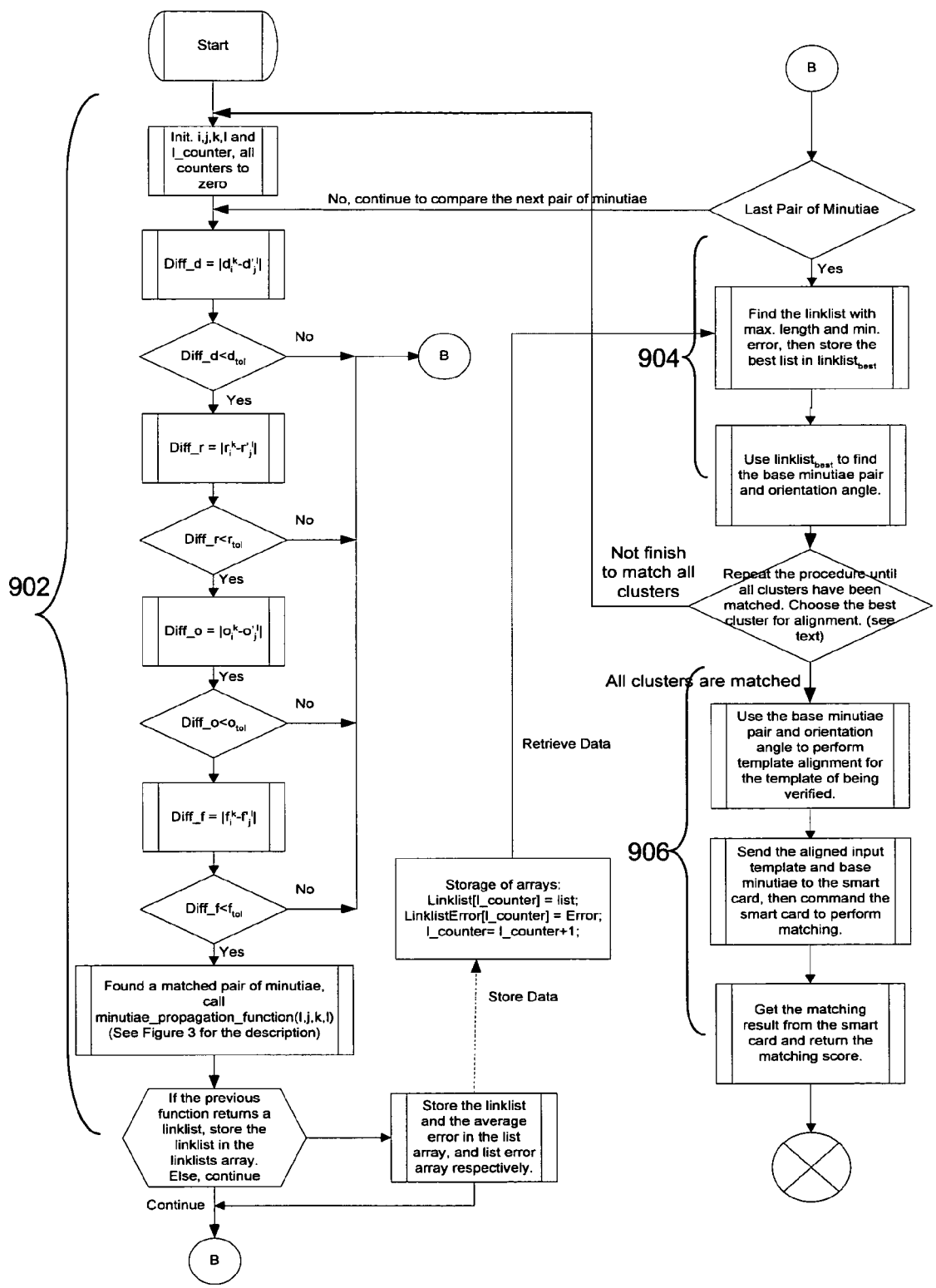
FIG. 9 shows a flowchart of determining a similarity value of a first minutiae template and a second minutiae template according to an embodiment.

FIG. 9 shows the flowchart of determining a similarity value of a first minutiae template and a second minutiae template according to an embodiment.

The embodiment in FIG. 9 utilizes the minutiae propagation matching as described above in the matching of the first minutiae template and the second minutiae template. The minutiae propagation matching is to link the matched minutiae together to form relation in the matched clusters. For un-matched fingerprint, it is possible to find a few pairs of matched minutiae in the fingerprint without relations. For matched fingerprint, the chance of finding a matched pair with relation to other matched pair is higher than un-matched fingerprints.

In FIG. 9, the determination process starts from the matched clusters, e.g. a pair of clusters having the highest similarity value among their cluster characteristics. A minutiae matching search is performed within the selected pair of clusters to determine the pairs of matched minutiae. The conventional way is to perform exhaustive search in the cluster to find the best matched pair, which is computational intensive. The method according to the embodiment is based on the finding that after one matched pair is found, the chance of finding another matched pair nearby is very high. Hence, the minutiae propagation as used in the embodiment accelerates the overall searching scheme.

At 902, the search starts from the minutiae near the centroid of the selected clusters. The parameters of minutiae from the first template and the second template are compared to find a first pair of matched minutiae which satisfies the criteria: Diff_d<$d_{TOL}$, Diff_r<$r_{TOL}$, Diff_o<$o_{TOL}$, and Diff_f<$f_{TOL}$ as described above. Once the first pair of matched minutiae is determined, minutiae_propagation_function is performed to search matched pairs nearby. The details of the minutiae propagation function is described in FIGS. 6 and 7 above.

All the matched pairs, including the linked pairs that were determined by minutiae_propagation_function, are stored in a Linklist[ ] array. If the number of total linked pairs is more than certain percentage of the total number of minutiae in the template, the function will stop searching and will start the alignment process. Otherwise, the search will be continued until all the minutiae inside the cluster have been compared. If no matched minutiae are found, the process will be terminated and report a zero score.

From the determined linked pairs of matched minutiae from the first template and the second template, a reference pair of matched minutiae, also referred to as a base pair of matched minutiae are determined at 904. In one embodiment, the reference pair of matched minutiae may be determined to be the pair of matched minutiae having the minimum matching error.

In another embodiment, the clusters from which the matched minutiae linked list are found are linked to the adjacent clusters to form a complete matched minutiae graph of the templates. The reference pair of matched minutiae may be determined by finding the best matched cluster having the maximum number of matched minutiae and the minimum matching error, and selecting the minutia near the centroid of the best matched cluster as the reference minutia. If there are more than one minutiae having the same distance from the centroid the best matched cluster, the minutia having lower link error is selected as the reference minutia.

The first template and the second template are then aligned based on the reference pair of matched minutiae and the determined orientation angle at 906, and the aligned templates are then matched to determine the similarity value (also referred to as matching score) between the first template and the second template.

FIG. 10 shows the flowchart of determining the similarity value between a first minutiae template and a second minutiae template according to an embodiment.

In FIG. 10, the first minutiae template and the second minutiae template may be aligned based on the reference pair of matched minutiae as described in the embodiments above. After the alignment, the respective template may be transformed to be in the form of polar coordinate. Hence, the distance d, normalized ridge direction n, angular difference between ridge direction o and slope between nearest minutia f, and minutiae type can be compared directly.

The determination of similarity value is carried out using a comparison and rewarding scheme (CRS). As shown in FIG. 10, if Diff_d, Diff_o and Diff_f are smaller than a respective tolerance $d_{tol}$, $o_{tol}$ and $f_{tol}$ respectively, a base score S1 will be awarded at 1002. If the minutia type t can be matched, a type score S2 will be awarded at 1004. If Diff_d and Diff_f are smaller than a more restrictive tolerance $d_{tol2}$ and $f_{tol2}$ respectively, a tolerance score S3 will be awarded at 1006. It is possible to scale up the number of CRS in the similarity value determination process for more accurate matching. All minutiae in both templates are cross matched, except those matched minutiae with matching score that is higher than S1. After the cross matching is completed, a final matching score is determined by dividing the total matching score with the maximum number of minutiae. The final matching score is considered as the similarity value between the first minutiae template and the second minutiae template, and may be used to determine whether a person from whom the first minutiae template is obtained is a genuine user or an impostor based on the similarity to the second minutiae template which is a certified enrolment template.

Various embodiments provide the determination of the similarity value based on the cluster characteristics of the first clusters and the second clusters from the two templates and the determination of pairs of matched minutiae based on the nearest neighbour propagation, thereby accelerating the determination process. However, the embodiments of determining the similarity value between two minutiae templates including determination of a reference pair of matched minutiae and alignment of two templates using the reference pair may involve exhaustive searching and calculation, which may make the determination process computational intensive.

Especially, when a processing unit with limited processing power is used, such as a low-end smart card or USB controller having 8-bit processor or a reader having limited processing power, the determination of the similarity between two templates becomes slow.

A further embodiment provides a load sharing method such that the determination of similarity value between the minutiae templates as described in the embodiments above may be shared between a first processor and a second processor.

In an embodiment, a first part of the determination of similarity value between the minutiae templates may be carried out by a second processor, and a second part of the determination of similarity value between the minutiae templates may be carried out by the second processor. Here, the second part of the method is different from the first part of the method. The second part of the method is named corresponding to the second processor, and is not necessarily carried out after the first part of the method.

The first processor may be an external processor to the second processor, wherein the first processor and the second processor may have different security levels in an embodiment, and may have the same security levels in another embodiment. In one embodiment, the first processor may be a trusted processor, for example, in an immigration gantry. In another embodiment, the first processor may be an untrusted processor, for example, in a home PC or a reader having a fingerprint sensor.

The second processor may be a trusted processor. In an embodiment, the second processor is a portable processing device, such as a smart card processor or a USB processor, wherein a second template being an enrolment minutiae template is stored.

Results of the first processor may be transmitted to the second processor, such that the second processor may use the results of the first processor to carry out the second part of the method. The results of the first processor may be a first template which is an input minutiae template detected from a user. The second part of the method may include confidential portions of the determination method.

The results of the second part of the method may be transmitted to the first processor, such that the first processor may use the results of the second part of the method to carry out the first part of the method. The results of the second part of the method transmitted to the first processor may be non-confidential information, such as relative information between the minutiae of the first minutiae template or the second minutiae template. For example, the information of the minutiae in the enrolment template may be transformed to a relative information being the distance of each minutia from a determined reference minutia in the enrolment template. The first part of the method may include open portions of the determination method.

In an embodiment to speed up the determination of similarity value between the two templates, the first part of the method and the second part of the method may be determined according to the following process.

The first part of the method may include the determination of the plurality of first clusters and the plurality of second clusters from the two templates, the determination of the respective cluster characteristics for the first clusters and the second clusters, the determination of cluster similarity values for each pair of clusters being compared, the determination of pairs of matched minutiae, the determination of a reference pair of matched minutiae from the two templates, partial alignment of two templates, and/or partial determination of the preliminary matching score between the templates.

The second part of the method may include the determination of the plurality of first clusters and the plurality of second clusters from the two templates, the determination of the respective cluster characteristics for the first clusters and the second clusters, the determination of cluster similarity values for each pair of clusters being compared, the determination of pairs of matched minutiae, the determination of a reference pair of matched minutiae from the two templates, partial alignment of two templates, partial determination of the preliminary matching score between the templates, and/or determination of a final matching score (i.e. the similarity value) between the two templates.

It is also possible in other embodiments that the first part of the method and the second part of the method are both carried out by the first processor or the second processor, depending on the processing power the first processor and the second processor and depending on the desired security level.

By the above embodiments of carrying out the open portions of the determination method in the first processor and carrying out the confidential portions of the determination method in the trusted second processor, a secured load sharing scheme is implemented to speed up the processing time. In the embodiment, the first processor may be included in a reader, which may be a relatively more powerful processor such as a 32-bit RISC. The trusted second processor may be included in a token, which may be a low-end processor (e.g. 8-bit 5 MHz 8051 architecture) due to manufacturing cost reduction and limitation in size. The first processor is accordingly used to assist the second processor to do part of the calculation in the determination process. The reader may include a communication unit to communicate with the token. If the token is a smart card, the communication unit may be a ISO7816 or ISO14443 conform smart card reader. If the token is a USB Thumb Drive, the communication unit may be the USB controller.

In addition, the above embodiments of performing the first part of the method and the second part of the method by the first processor and the second processor are secure since the confidential enrolment template information is not released to the first processor (i.e. the reader). Therefore, by only transmitting the relative information of the enrolment template to the first processor, the original enrolment template information will not be stolen by wire tapping during communication between the first processor and the second processor.

The alignment of the first minutiae template and the second minutiae template mentioned above is described in more detail below.

After a reference pair of matched minutiae is determined according to the embodiments above, the first template (i.e. the input template to be verified) may be aligned on the first processor (e.g. the reader), and the second template (i.e. the enrolment template) may be aligned on the second processor (e.g. the token), such that the Cartesian coordinate of the respective minutia is transformed to polar coordinate. Accordingly, distance calculation and trigonometry calculation are involved during alignment, which are computation intensive for low end processor with limited resources.

In an embodiment, the alignment of the second template may also be carried out on the first processor having higher processing power, so as to speed up the alignment of the second template. However, it is not secure to send the coordinates of the minutiae in the second templates to the first processor. In an embodiment relative information of the second template is sent instead of absolute information to the first processor, as relative information cannot be used to reconstruct the second template.

For example, the second template, i.e. the enrolment template may be represented by M_Token={$X_i$, $Y_i$, $\theta_i$, $t_i$, and other features}, wherein ($X_i$, $Y_i$) is the coordinate of minutiae (i=1, . . . , n, where n is the number of minutiae in the enrollment template). ($X_b$, $Y_b$) is the coordinate of the reference minutia of the reference pair of matched minutiae in the enrolment template.

Therefore, the transformation of enrolment template may be carried out as follows:

The Distance: $Dist_i = \sqrt{(X_i-X_b)^2+(Y_i-Y_b)^2}$.

The Angle: $Ang_i = \text{ATAN}((Y_i-Y_b)/(X_i-X_b))$.

In the above transformation, the computation of square, square root and arc tangent are quite time consuming, especially when the number of minutiae is large. In an embodiment, the calculation can be split into two sections, wherein the calculation of the subtraction may be executed on the token having lower processing power, and the calculation of square, square root and arc tangent may be executed on the reader having higher processing power.

$DX_i = (X_i - X_b)$ $DY_i = (Y_i - Y_b)$

A relative information template (RIT) may be constructed to be transmitted to the reader for distance and angle calculation. The format of the RIT is:

$\text{RIT} = \{DX_i, DY_i, i\}$

In an embodiment, the RIT for all the minutiae in the enrolment template may be transmitted to the reader for transformation calculation. In another embodiment, a portion of the RIT for part of the minutiae in the enrolment template may be transmitted to the reader, while the other portion of RIT is retained at the token for transformation calculation carried out at the token. The information in the RIT may be in a scrambled order for better security, as will be described in a later part of the description.

Once the reader receives the RIT, the reader will calculate the distance Dist, and the angle Ang according to the equations above, thereby transforming the Cartesian coordinate of the minutiae to polar coordinate. The two templates may be aligned accordingly.

When the input template and the enrolment template are aligned, a cross-matching between the aligned templates may be performed. Cross-matching may be time consuming due to exhaustive matching of minutiae involved.

The aligned enrolment template at the reader only includes partial information of the minutiae reconstructed by the relative information template (RIT), such as the relative distance and relative angle, but does not include other features of the minutiae, such as the type of the minutiae and the ridge direction of the minutiae.

In one embodiment, both aligned input template and aligned enrolment template are transmitted to the token to do the final matching, i.e. to determine the similarity value between the two templates.

In another embodiment, a preliminary matching is carried out at the reader to compute a local minutiae matching score, and to rearrange the position of minutiae in both templates according to the optimal local minutiae matching score (with minimum distance and angle error). This may speed up the matching process as the token does not need to perform exhaustive scanning for all the minutiae in both templates. The matched minutiae pairs may be transmitted to the token, and a final matching using the un-used features, such as local ridge frequency, ridge direction and other local features of minutiae, may be carried out at the token.

According to an embodiment, the preliminary matching between the aligned input template and the aligned enrolment template may be performed to determine an initial matching list (IML) of matched minutiae. The IML may include the pairs of matched minutiae and the initial matching scores of the matched pairs. The initial matching score may be determined by calculating the distance error and angle error between the respective minutiae from the two templates.

The input template is represented as M_input={$X'_j$, $Y'_j$, $\theta'_j$, $t'_j$, and other features}, wherein ($X'_j$, $Y'_j$) is the coordinate of minutiae (j=1, . . . , m, where m is the number of minutiae in the input template). ($X'_b$, $Y'_b$) is the coordinate of the reference minutia of the reference pair of matched minutiae in the input template. Therefore, the transformation of enrolment template is carried out as follows:

The Distance: $Dist'_j = \sqrt{(X'_j-X'_b)^2+(Y'_j-Y'_b)^2}$;

The Angle: $Ang'_j = \text{ATAN}((Y'_j-Y'_b)/(X'_j-X'_b)) - \theta_{orient}$;

wherein $\theta_{orient}$ is the difference in orientation angle between the input template and the enrolment template, for alignment of the two templates An error value is determined for each pair of minutiae under comparison according to the following equation:

$Err_{ij} = w_1 * \text{abs}(Dist_i - Dist'_j) + w_2 * \text{abs}(Ang_i - Ang'_j)$ wherein $w_1$ and $w_2$ are weighting factors, and the sum of $w_1$ and $w_2$ are equal to 1. abs ( ) represents the absolute value of the difference between the two elements.

The pairs of matched minutiae having its matching error $Err_{ij}$ less than a predetermined minimum error tolerance (MET), are included in the initial matching list (IML). In addition, a best matching pair may be determined which has the minimum error compared with other pairs of matched minutiae.

When the best matching pair is determined, the following algorithm may be carried out to determine the local matching score for each pair of matched minutiae.

| | |
|---|---|
| D_Dist = | abs($Dist_i$ – $Dist'_j$); |
| D_Angle = | abs($Ang_i$ – $Ang'_j$), |
| adj_dds = | (MaxDiffDist – D_Dist); //MaxDiffDist is the maximum distance tolerance to match minutiae. |
| LocalScore = | (adj_dds*10); // calculate the score base on the error in distance. |
| adj_dos = | MaxDiffOrientAngle – D_Angle; // MaxDiffOrientAngle is the max. angle tolerance to match minutiae. |
| LocalScore += | (adj_dos/100); // calculate the score base on the error in Angle. |

The initial matching list is represented by:

$\text{IML} = \{Ml_k, Ml'_k, \text{LocalScore}_k\}$

Wherein Ml and Ml' are the index of the matched minutiae in the enrollment template and the index of the matched minutiae in the input template respectively. LocalScore is the initial matching score. $Ml_k$ is usually arranged from 1 . . . k in ascending order. In another embodiment, it may also be arranged in random order or a predetermined order as will be described in a later part of the description.

The IML and other minutiae information of the input template, such as $\theta'_j$, $t'_j$ and other features of the minutiae may be transmitted to the token for final determination of the similarity value between the input template and the enrolment template. This information may be constructed as a final template (FT) to be transmitted to the token:

$$FT = (Ml_k, Ml'_k, LocalScore_k, \theta'_k, t'_k, \text{ and other feature}_k)$$

wherein $\theta'_k$, $t'_k$, and other feature$_k$ are ridge direction, minutiae type and other features of the minutia $Ml'_k$ from the input template. There may be some un-matched minutiae, the processing of which will be described in a later part of the description.

Since the final template includes the pairs of matched minutiae and their local score, the determination of the final matching score is to be carried out based on the other features of minutiae included in the FT.

The final matching score may be determined according to the following equation:

$$FinalScore = \sum_{k=0}^{L}(LocalScore_k + FT\_Score_k);$$

$$(\text{if } n > m, L = n; \text{ else } L = m)$$

wherein FT_Score is the matching score determined using $\theta'_k$, $t'_k$, and other feature$_k$, n and m are the number of minutiae in the enrolment template and in the input template respectively. The following pseudo code illustrates the determination of the final score for the two templates using the other features of the minutiae.

```
FinalScore + = LocalScore_k; // add the local score to the final score
if(t_k = = t'_k) // match in minutiae type.
FinalScore + = 20; // add 20 in the final score.
Diff_RidgeDir = abs(θ_k - θ'_k); // calculate the error in ridge direction.
If (Diff_RidgeDir < MaxDiffRidgeDir) // MaxDiffRidgeDir is the
maximum ridge direction tolerance to match minutiae.
{
    FinalScore + = (MaxDiffRidgeDir - Diff_RidgeDir )/100;
}
If (other feature matched)
    FinalScore + = Feature Score;
FinalScore = FinalScore/L; // Calculates the normalized final score.
```

The final score as determined in accordance with the embodiment above represent the similarity between the input template and the enrolment template, and is also referred to as the similarity value between the input template and the enrolment template.

In another embodiment as described above, the determination of the similarity value between the first minutiae template and the second minutiae template may further include determining a weighted sum of the differences between the first relative distance information of the first minutiae template and the second relative distance information of the second minutiae template. Accordingly, the weighted sum of the differences between the first and the second relative distance information may be scaled and added in the final matching score above.

The above embodiments of aligning the two templates and of determining the similarity value between the two templates are carried out at the reader and at the token, so that the determination process may be shared between the reader and the token to speed up the whole determination process.

For example, if the processing power of the token is low, it is advantageous to send all relative information of the enrolment template to the reader for alignment of the two templates and for determination of local score of matched minutiae as described above. In some cases, some token with intermediate performance CPU, such as a 16-bit smart card, may be used which has enough processing power to match certain number of minutiae within an acceptable duration. As the matching duration has exponential increasing relationship with the number of minutiae, the token with intermediate processing power may be used to match up to certain number of minutiae.

According to an embodiment, the determination of the first part of the method and the second part of the method to be carried out in the first processor (e.g. the reader) and the second processor (e.g. the token) may be carried out according to a predefined load sharing criterion. For example, an adaptive load sharing mechanism may be performed to determine the first part of the method and the second part of the method and to control the amount of relative information of the enrolment template to be computed on the reader side and on the token side.

In an embodiment, the adaptive processing control mechanism uses the number of minutiae to determine which part of the method of determining a similarity value is to be carried out at the first processor (i.e. the reader) or the second processor (i.e. the token).

In one embodiment, if the number of minutiae to be matched is small and the token has sufficient processing power, all the determination method is executed inside the token. Accordingly, no relative information of the enrolment template will be sent to the reader, thus ensuring the highest level of security. In another embodiment, if the number of minutiae to be matched is in an intermediate size and the token cannot process all minutiae within a specific time duration, some of the minutiae will be sent to the reader to process and the rest will be processed locally at the token. In a further embodiment, if the number of minutiae in both enrollment template and input template is large or the local processing power is too low and the security requirement is low, all relative information will be sent to the reader side for processing.

In another embodiment, if security requirement is high, all the processing will be executed inside the token without the consideration of the number of minutiae. The following pseudo code summarizes the above adaptive processing control mechanism.

```
n- Number of minutiae in enrollment template
m- Number of minutiae in input template.
If (n>m) // use the largest number of minutiae to determine the load sharing strategy
    MaxNumMinutiae = n;
else
    MaxNumMinutiae = m;
If (MaxNumMinutiae < Acceptable_Processing_Threshold || SecurityLevel = = HIGH)
    Match_on_token_only( ); // only process on the token side.
else if (MaxNumMinutiae <= Intermediate_Processing_Threshold)
    Partial_preliminary_match_on_token(MaxNumMinutiae); // Partially process
on .the reader side.
```

```
else if (MaxNumMinutiae >= Intermediate_Processing_Threshold && SecurityLevel ==
LOW)
    Total_off_card_processing( ); // process all the relative information on the
reader side.
``` wherein

Acceptable_Processing_Threshold is the number of minutiae that can be matched inside the token within an acceptable time frame, and Intermediate_Processing_Threshold is the number of minutiae that can be matched with the aid of the reader within acceptable time frame.

In accordance with the above embodiment, wherein it is determined that a partial preliminary matching is to be carried out at the reader, it may be provided to determine the amount of relative information that is to be transmitted to the reader for processing.

For example, assume that the token can process N minutiae within 1.5 seconds, 2 seconds is the maximum allowable matching time, and 0.5 second is the time to calculate the final score (excluding communication overheads). If the number of minutiae of input template is M which is larger than N, at least M−N minutiae need to be transmitted to the reader for processing, in order to maintain the maximum allowable matching time within 2 seconds. The following pseudo code illustrates the determination of the number of minutiae that needs to be transmitted to the reader.

```
Let M be the number of minutiae needs to be processed.
if(M<=N)
    SkippingFactor = 0; // all minutiae will be processed in the token.
else
{
    SkippingFactor = (M/N); // integer division is used.
}
//Number of minutiae that needs to be sent to the reader:
NM_out = M/(SkippingFactor+1)
```

In this embodiment, skipping index method may be used to determine the minutiae that are needed to be sent to the reader. For Skipping Factor=1, that means the minutiae in the template will be sent alternatively, e.g. odd number indexed minutiae will be sent and even number indexed minutiae will be kept in the token for processing. For Skipping Factor=2, that means for every 3 minutiae, 2 minutiae will be sent out. By using this method, a partial relative information template (RIT) can be compiled for sending to the reader.

An embodiment of determining the similarity value between two templates including the partial processing at an external processor may include the following processing procedures:

1) Send the determined partial relative information template (RIT) to the external processor.

2) Perform the partial processing at the external processor to determine a final template (FT) and a list of un-matched minutiae, and transmit the final template and the list of un-matched minutiae to the trusted processor.

3) Perform matching for the un-matched minutiae (in input template) with the local un-sent minutiae (in enrolment template), and calculate a second matching score at the trusted processor.

4) Calculate a first score using the LocalScore (for matched minutiae calculated at the external processor) and FT_Score (for other features of matched minutiae calculated at the trusted processor).

5) Add the scores from procedure 3 and 4 to determine the final overall score.

Process 4) used the method described above to determine the initial matching list (IML) and final template (FT). As the relative information template (RIT) only includes part of the relative information of the minutiae in the enrolment template, the external processor may only match part of the minutiae from the input template to the minutiae in the enrolment template. Hence, a number of minutiae in the input template fails to be matched. These un-matched minutiae may be transmitted to the trusted processor to perform further matching as in process 3) above. In an example, an un-matched minutiae template (UMT) may be represented by:

$$UMT = \{index, X'_{index}, Y'_{index}, \theta'_{index}, t'_{index}, \text{ and other features}_{index}\}$$

The UMT may be transmitted together with the final template (FT) described above to the trusted processor for further processing. The following structure combines the FT and UMT that will be set to the trusted processor for final matching:

$$FT_{partial}\{FT, UMT\}.$$

In accordance with the above embodiments, wherein part of the determination method may be carried out in a first processor (e.g. an external processor), only the relative information (i.e. non-confidential information) of the enrolment template is send to the first processor for processing. It is not possible to use relative information to reconstruct the enrolment minutiae template. However, the relative information will go through physical communication channel. Eavesdropping by hacker to steal such information for Trojan horse attack may be possible. All communication channels should be secured, but due to limited processing power of the token with a low-end processor, encryption technique used in the token is usually weak. Accordingly, it is necessary to encode the relative information data such that it can be used once only in order to secure the determination method.

Usually, the order of minutiae index in the enrolment template is in an ascending order from 1 to N. If all of part of relative information of the minutiae in the enrolment template is to be sent to an external processor for processing and the communication is wire tapped, the hacker can record this communication between the external processor and the trusted processor. If the encryption key is broken, the recorded information can be play back with the cracked keys by the Trojan horse to gain access from the smart card. This problem may also exist in a total match-on-card system wherein the matching is performed totally at the trusted processor.

In accordance with the embodiment, a random minutiae re-ordering method is used to protect the transmitted information. To re-order the minutiae index, a random minutiae index vector (RMIV) may be used to re-map the original ascending order to random order.

The Random Minutiae Index Vector (RMIV):

Ascending order [1, 2, 3, 4, 5, . . . , N]→Random index [19, 3, 21, 4, 8, . . . , 6] (one-to-one mapping)

The RMIV may be generated at the external processor and is sent to the trusted processor. The trusted processor uses this new index sequence to synthesis relative information template (RIT) and send the RIT to the external processor for processing. The external processor uses RMIV to compile the $FT/FT_{partial}$ for the trusted processor to perform final matching. The trusted processor will use the RMIV to decode the order of the minutiae inside the trusted processor only. If the authentication is done and access is granted, this RMIV is stored in the memory of the trusted processor for future use. Otherwise, this RMIV is discarded.

In the next matching, the external processor will generate a new RMIV. The trusted processor will compare the new RMIV and the stored RMIV (used in the previous transaction). If both are identical, the trusted processor will refuse to do any matching further because the sequence may be a recorded sequence. Otherwise, the trusted processor will continue to do matching. If the access is granted, the trusted processor will overwrite the old RMIV with this new RMIV. Hence, by using this method, the Trojan horse attack by recording can be eliminated.

An embodiment also relates to a device for determining a similarity value between a first template and a second template according to the method as described above.

The device may be a processor for performing all the similarity determination method in an embodiment, and may include a first processor and a second processor in another embodiment wherein a first part of the method is carried out in the first processor and a second part of the method is carried out in the second processor. The determination of the first part of the method and the second part of the method may be performed according to the load sharing method or the adaptive load sharing method described above.

The device may include a plurality of units corresponding to the steps of the similarity determination method, such as a first cluster characteristic determination unit, a second cluster characteristic determination unit, a similarity determination unit, a first cluster determination unit, a second cluster determination unit, a first relative distance information determination unit, a second relative distance information determination unit, a matched minutiae determination unit, a reference minutiae selection unit, and a template alignment unit, etc. The above units may be implemented in a programmable processor programmed with a plurality of modules/functions corresponding to the respective unit. It is noticed that some or all of the above units may be comprised in one processor, such as the smart card for performing the similarity determination within the smart card. It is also possible that some or partial of the above units may be comprised in a first processor and a second processor, respectively, so that the similarity determination process may be carried out by both the first processor and the second processor.

The embodiments as described above may accelerate the similarity determination process. For example, the pre-matching based on the clustering approach to determine the best matching minutiae or region(s) for matching and the alignment scheme can accelerate the determination of the reference pair of matched minutiae up to 3 times faster with slightly degradation in accuracy. The adaptive load sharing scheme according to the embodiments also may accelerate the on-card matching for 2-3 times (depends on smartcard). The method as described in the embodiments above may be implemented in resource-constrained platform such as a smart card and an embedded system. In addition, an embodiment also provides a secure minutiae re-ordering for communication scheme to protect the template information during matching.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method operating on one or more processors for determining a similarity value between a first minutiae template and a second minutiae template, the method comprising:
    determining a first cluster characteristic for each first cluster of a plurality of first clusters, each first cluster comprising a plurality of first minutiae comprised in the first minutiae template;
    determining a second cluster characteristic for each second cluster of a plurality of second clusters, each second cluster comprising a plurality of second minutiae comprised in the second minutiae template;
    determining the similarity value based on the first cluster characteristics and the second cluster characteristics.

2. The method of claim 1,
    wherein the cluster characteristic comprises information about the shape of each cluster.

3. The method of claim 2,
    wherein the cluster characteristic comprises information about the convex hull of each cluster and/or information about the position about the centroid of each cluster.

4. The method of claim 1,
    wherein the cluster characteristic comprises information about the size of each cluster.

5. The method of claim 1,
    wherein the cluster characteristic comprises information about the minutiae included in each cluster.

6. The method of claim 5,
    wherein the cluster characteristic comprises at least one of the following information elements:
        a number of the minutiae included in each cluster;
        a density of the minutiae included in each cluster;
        an average ridge number between two adjacent minutiae in each cluster;
        position of a fingerprint core;
        number of fingerprint cores in each cluster;
        position of a fingerprint delta;
        number of fingerprint deltas in each cluster.

7. The method of claim 1, further comprising:
    determining a plurality of first clusters, each first cluster comprising a plurality of first minutiae comprised in the first minutiae template.

8. The method of claim 1, further comprising:
    determining a plurality of second clusters, each second cluster comprising a plurality of second minutiae comprised in the second minutiae template.

9. The method of claim 1,
    wherein the determining the similarity value comprises determining a weighted sum of the differences between the first cluster characteristics and the second cluster characteristics; and
    wherein the method further comprises determining a plurality of cluster similarity values between the first clusters and the second clusters using the weighted sum.

10. The method of claim 1, further comprising:
    determining a first relative distance information for the plurality of first clusters, wherein the first relative distance information comprises relative distance between nearest centorids of the plurality of first clusters; and determining a second relative distance information for the plurality of second clusters, wherein the second relative distance information comprises relative distance between nearest centorids of the plurality of second clusters.

11. The method of claim 10, wherein the determining the similarity value between the first minutiae template and the second minutiae template further comprises determining a weighted sum of the differences between the first relative distance information and the second relative distance information.

12. The method of claim 1, further comprising:

determining a first pair of matched minutiae of a first cluster of the plurality of first clusters and a second cluster of the plurality of second clusters; and determining a second pair of matched minutiae of the first cluster of the plurality of first clusters and the second cluster of the plurality of second clusters by matching the nearest neighbour minutiae of the matched minutia of the first pair of matched minutiae in the first cluster and the nearest neighbour minutiae of the matched minutia of the first pair of matched minutiae in the second cluster.

13. The method of claim 12, further comprising:

selecting a pair of matched minutiae with respect to a predefined matching criterion from the first pair of matched minutiae and the second pair of matched minutiae as a reference pair of matched minutiae; and carrying out an alignment of the first minutiae template and the second minutiae template using the reference pair of matched minutiae.

14. The method of claim 1, wherein a first part of the method is carried out by a first processor; and wherein a second part of the method is carried out by a second processor, the second part of the method being different from the first part of the method.

15. The method of claim 14, wherein the second processor uses results of the first processor for carrying out the second part of the method.

16. The method of claim 14, further comprising:

transmitting results of the second part of the method from the second processor to the first processor.

17. The method of claim 14, wherein the first processor uses the results of the second part of the method for carrying out the first part of the method.

18. The method of claim 14, wherein the results of the second part of the method transmitted to the first processor is non-confidential information.

19. The method of claim 18, wherein the results of the second part of the method transmitted to the first processor comprises relative information between the minutiae of the first minutiae template or the second minutiae template.

20. The method of claim 14, wherein the first part of the method comprises open portions of the method; and wherein the second part of the method comprises confidential portions of the method.

21. The method of claim 14, wherein the processes provided for the first part of the method and the processes provided for second part of the method are determined in accordance with a predefined load sharing criterion.

22. A device comprising one or more processors for determining a similarity value between a first minutiae template and a second minutiae template, the device comprising:

a first cluster characteristic determination unit for determining a first cluster characteristic for each first cluster of a plurality of first clusters, each first cluster comprising a plurality of first minutiae comprised in the first minutiae template;

a second cluster characteristic determination unit for determining a second cluster characteristic for each second cluster of a plurality of second clusters, each second cluster comprising a plurality of second minutiae comprised in the second minutiae template;

a similarity determination unit for determining the similarity value using the first cluster characteristics and the second cluster characteristics.

* * * * *